United States Patent
Morotomi et al.

(10) Patent No.: US 10,322,768 B2
(45) Date of Patent: Jun. 18, 2019

(54) STRADDLE VEHICLE

(71) Applicant: KAWASAKI JUKOGYO KABUSHIKI KAISHA, Kobe-shi (JP)

(72) Inventors: Satoshi Morotomi, Kakogawa (JP); Hideaki Kawai, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 15/994,636

(22) Filed: May 31, 2018

(65) Prior Publication Data

US 2019/0077482 A1 Mar. 14, 2019

(30) Foreign Application Priority Data

Sep. 11, 2017 (JP) .................. 2017-173671

(51) Int. Cl.
*B62K 19/30* (2006.01)
*B62K 11/04* (2006.01)

(52) U.S. Cl.
CPC .............. *B62K 19/30* (2013.01); *B62K 11/04* (2013.01); *B62K 2208/00* (2013.01)

(58) Field of Classification Search
CPC .......... B62K 19/30; B62K 11/04; B62K 11/00
See application file for complete search history.

(56) References Cited

U.S. PATENT DOCUMENTS

| | | | | |
|---|---|---|---|---|
| 7,527,115 B2* | 5/2009 | Tsuya | ..................... | B62K 11/04 123/41.6 |
| 8,413,754 B2* | 4/2013 | Matsuda | ................ | B62K 19/30 180/219 |
| 2009/0008900 A1* | 1/2009 | Ishikawa | .................. | B62J 25/00 280/291 |
| 2009/0013953 A1* | 1/2009 | Fujita | ................. | B01D 46/0023 123/184.21 |
| 2010/0314188 A1* | 12/2010 | Goto | ...................... | B62K 11/04 180/219 |
| 2011/0160976 A1* | 6/2011 | Matsuda | ............... | B60T 8/1706 701/70 |
| 2011/0160977 A1* | 6/2011 | Matsuda | ............... | B60T 8/1706 701/85 |
| 2015/0185545 A1* | 7/2015 | Tetsuka | ............. | G02F 1/133382 180/90 |
| 2016/0076494 A1* | 3/2016 | Nishimura | ............. | B62K 11/00 180/219 |
| 2017/0089308 A1* | 3/2017 | Yamashita | ............. | B60K 13/02 |
| 2018/0251186 A1* | 9/2018 | Tsuda | .................... | B62K 25/283 |

FOREIGN PATENT DOCUMENTS

JP 2006-123656 5/2006

* cited by examiner

*Primary Examiner* — Brian L Swenson
(74) *Attorney, Agent, or Firm* — Fay Kaplun & Marcin, LLP

(57) ABSTRACT

A motorcycle includes a fuel tank, an engine, an air cleaner box, and an electrical component unit. The fuel tank stores a fuel. The engine is driven by the fuel stored in the fuel tank. The air cleaner box purifies air to be supplied to the engine. The electrical component unit includes two or more types of electrical components driven by electricity. The fuel tank and the engine are arranged vertically one above the other. At least part of the air cleaner box is positioned in a space between the fuel tank and the engine. The longitudinal position of at least part of the electrical component unit is more frontward than the rear end of the fuel tank and more rearward than the air cleaner box.

9 Claims, 7 Drawing Sheets

STRADDLE VEHICLE

BACKGROUND OF THE INVENTION

1. Field of the Invention

The present invention generally relates to a layout of an electrical component unit in a straddle vehicle.

2. Description of the Related Art

Conventionally, a number of electrical components are arranged in a straddle vehicle. Electrical components are sometimes collectively arranged in a place that is less likely to be influenced by heat, vibrations, and the like. In Japanese Patent Application Laid-Open No. 2006-123656, a regulator and a control unit are arranged on an upper surface of an air cleaner which is arranged in front of a fuel tank.

In a straddle vehicle of Japanese Patent Application Laid-Open No. 2006-123656, a plurality of types of electrical components (electrical component unit) can be arranged in a place having a relatively low temperature, because the upper surface of the air cleaner is likely to be exposed to ram air and the air cleaner is less likely to have a high temperature. In Japanese Patent Application Laid-Open No. 2006-123656, however, an electrical component unit is arranged in a front portion and an upper portion of the straddle vehicle. Thus, electrical components may be sometimes arranged in a position distant from the center of gravity.

SUMMARY OF THE INVENTION

The present invention relates a straddle vehicle in which an electrical component unit is arranged in a position near the center of gravity (near an engine or the vehicle center), where relatively small heat and vibrations occur, so that the straddle vehicle is given improved stability during traveling.

According to an exemplary embodiment of the present invention, a straddle vehicle configured as follows. The straddle vehicle includes a fuel tank, an engine, an air cleaner box, and an electrical component unit. The fuel tank stores a fuel. The engine is driven by the fuel stored in the fuel tank. The air cleaner box purifies air to be supplied to the engine. The electrical component unit includes two or more types of electrical components that are driven by electricity. The fuel tank and the engine are arranged vertically one above the other, and at least part of the air cleaner box is positioned in a space between the fuel tank and the engine. The electrical component unit is arranged such that the longitudinal position of at least part of the electrical component unit is more frontward than a rear end of the fuel tank and more rearward than the air cleaner box.

In this configuration, the electrical component unit can be arranged in a position close to the center. That is, the electrical component unit is likely to be positioned close to the center of gravity of the vehicle. Accordingly, the straddle vehicle can be stabilized while traveling.

In another exemplary embodiment of the present invention, an electrical component unit of the straddle vehicle is arranged such that the straddle vehicle is given good stability during traveling.

DETAILED DESCRIPTION OF THE PREFERRED EMBODIMENTS

Hereinafter, an embodiment of the present invention will be described with reference to the drawings. In descriptions below, front, rear, left, and right directions are defined relative to a direction in which a motorcycle 1 travels forward being set as the front, and in other words, the left-right direction (lateral direction) are defined based on the view from a rider riding on the motorcycle 1. Upper and lower sides are defined relative to the vertical direction. Terms describing positional relationships, sizes, shapes, and the like should be interpreted as encompassing not only a state where the meaning of the term is completely established but also a state where the meaning of the term is substantially established. A description "A is attached (mounted, installed, etc.) to B" should be interpreted as showing not only a configuration in which A is directly attached (mounted, installed, etc.) to B but also a configuration in which A is attached (mounted, installed, etc.) to B with interposition of another attachment member or the like.

Figure 1:
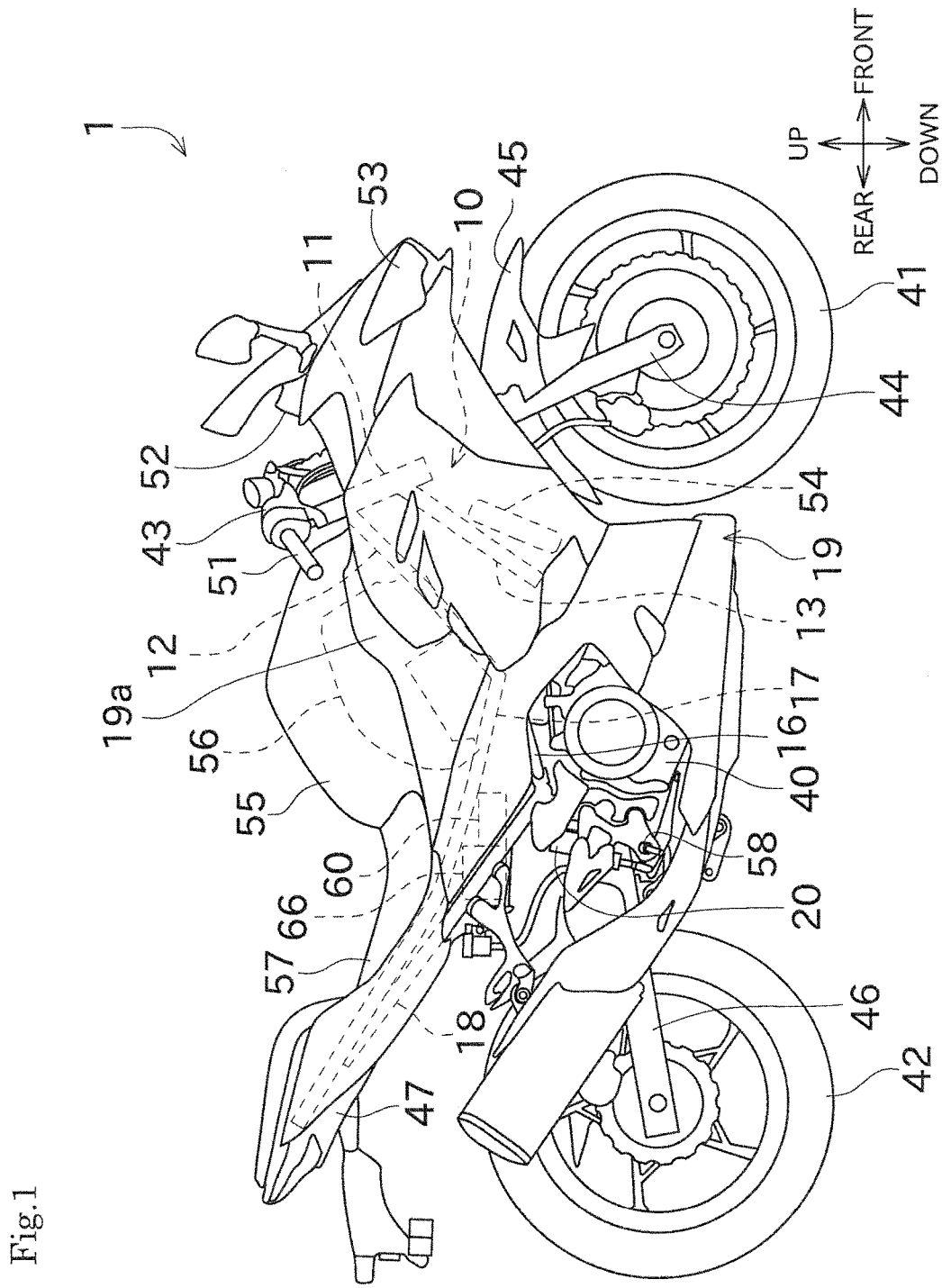
FIG. 1 is a side view of a motorcycle according to an exemplary embodiment of the present invention.
Figure 2:
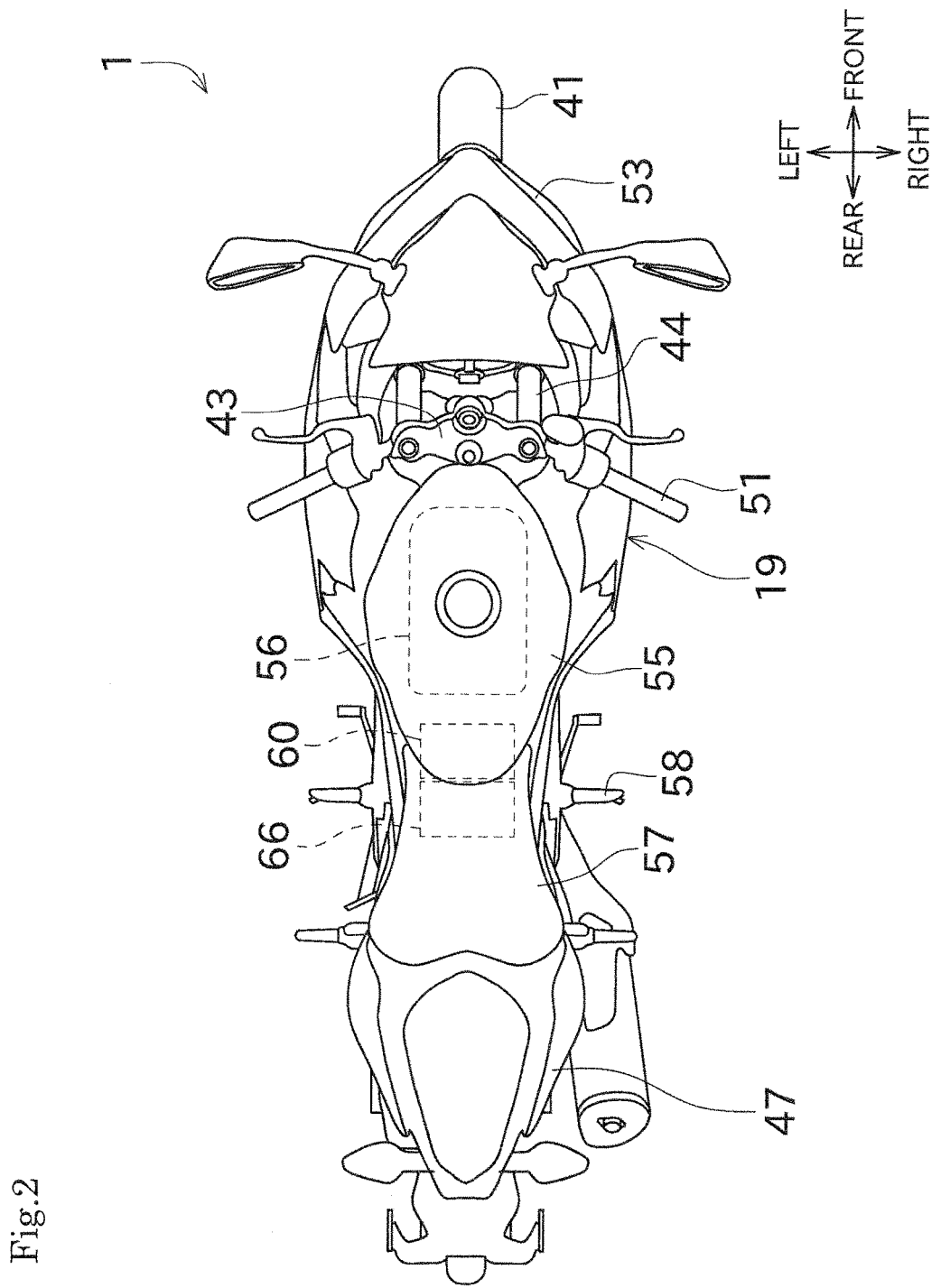
FIG. 2 is a top plan view of the motorcycle.
Figure 3:
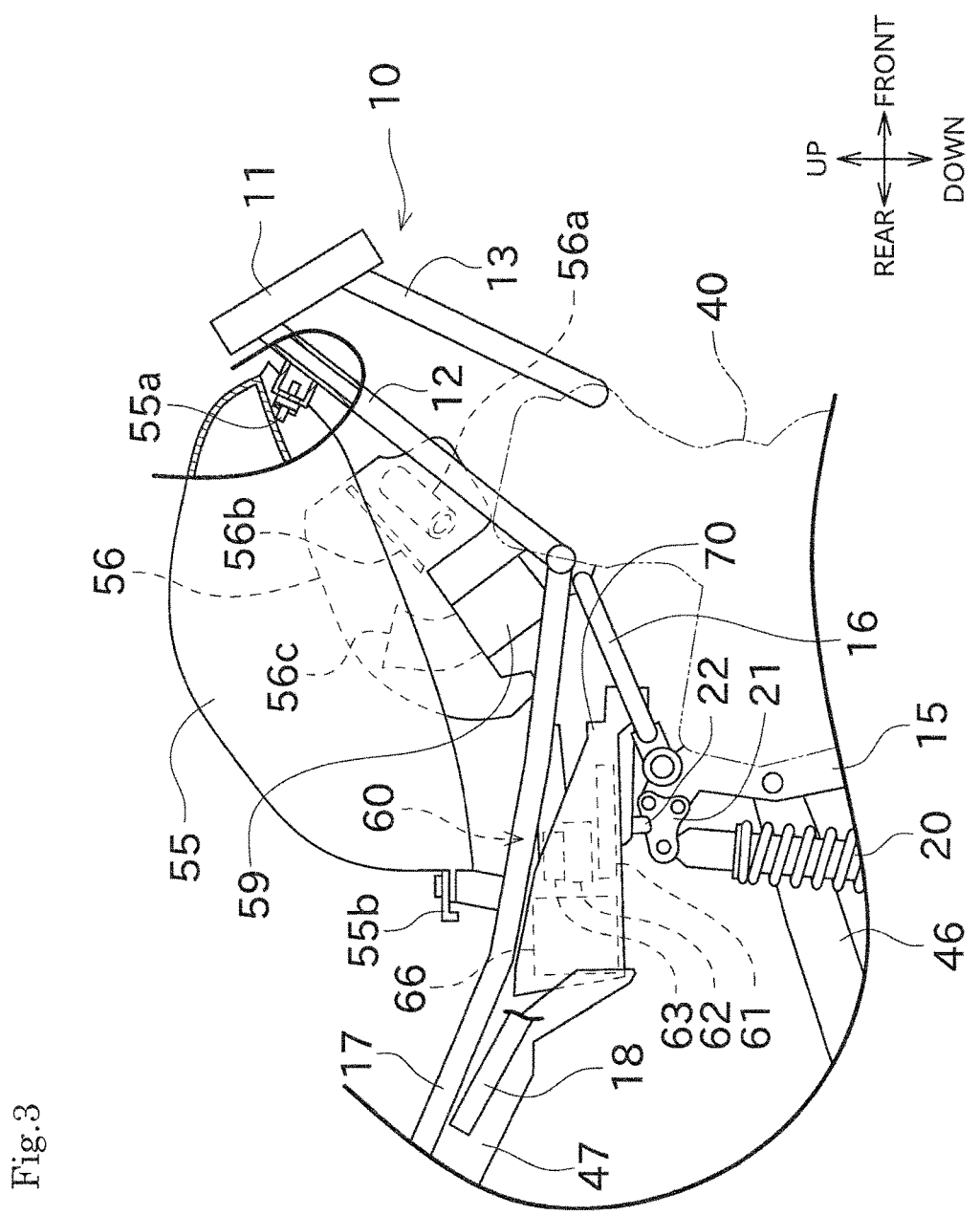
FIG. 3 is a side view showing an electrical component unit and component parts arranged in the vicinity of the electrical component unit.

First, outline of the motorcycle (straddle vehicle) 1 will be described with reference to FIG. 1 to FIG. 3. FIG. 1 is a side view of the motorcycle 1. FIG. 2 is a top plan view of the motorcycle 1. FIG. 3 is a side view showing an electrical component unit 60 and component parts arranged in the vicinity of the electrical component unit 60.

As shown in FIG. 1, the motorcycle 1 includes an engine 40, a front tire 41, and a rear tire 42. These members are supported on a vehicle body frame 10 shown in FIG. 1. The vehicle body frame 10 includes a head pipe frame 11, main frames 12, lower frames 13, rear frames 17, and rear stays 18.

The head pipe frame 11 has a shaft insertion hole for insertion of a steering shaft (not shown). An upper bracket 43 shown in FIG. 1 and FIG. 2 is attached to an upper portion of the head pipe frame 11. The upper bracket 43 and a lower bracket (not shown) have fork insertion holes for insertion of a pair of left and right front forks 44, respectively. In this configuration, the upper bracket 43 and the lower bracket support the front forks 44. The front tire 41 is rotatably attached to lower portions of the front forks 44. A front fender 45 is arranged above the front tire 41.

The main frames 12 and the lower frames 13 are connected to the head pipe frame 11. The main frames 12 comprise a pair of left and right main frames 12, each of which is arranged so as to extend from an upper portion of the head pipe frame 11 toward the rear (obliquely downward toward the rear). The lower frames 13 comprise a pair of left and right lower frames 13, each of which is arranged so as to extend from a lower portion of the head pipe frame 11 toward the rear (obliquely downward toward the rear). The engine 40 is attached to the rear ends of the lower frames 13.

The pair of left and right rear frames 17 are attached to the rear ends of the main frames 12, respectively. The rear frames 17 are arranged so as to extend from the rear ends (where the engine 40 is attached) of the main frames 12 toward the rear (obliquely upward toward the rear). As shown in FIG. 3, a pair of left and right frame coupling members 16 are also attached to the rear ends of the main frames 12, respectively. The frame coupling members 16 are arranged so as to extend toward the rear (obliquely downward toward the rear) below the rear frames 17. Swing arm brackets 15 are attached to the rear ends of the frame coupling members 16.

The swing arm brackets 15 are arranged so as to extend downward from the rear ends of the frame coupling members 16. Swing arms 46 are attached to the swing arm brackets 15. As shown in FIG. 1, the swing arms 46 are arranged so as to extend toward the rear. The rear tire 42 is rotatably attached to rear portions of the swing arms 46. Power generated by the engine 40 is transmitted to the rear tire 42 via a drive chain (not shown).

A rear suspension 20 is attached to an upper portion of the swing arm bracket 15 with interposition of an attachment member 21. The swing arm 46 is elastically supported by the rear suspension 20. More specifically, the rear suspension 20 couples the upper portion of the swing arm bracket 15 to the swing arm 46 via a rear suspension attachment mechanism (not shown). This configuration can absorb shock that the rear tire 42 receives from a road surface.

Below the rear frames 17, the pair of left and right rear stays 18 are arranged. The rear stays 18 are arranged so as to extend toward the rear (obliquely upward toward the rear). The rear frames 17 and the rear stays 18 support a rear fender 47 which is located above the rear tire 42.

A radiator 54 is arranged at the rear of the front tire 41. Cooling water (coolant) for cooling the engine 40 flows inside the radiator 54. The radiator 54 releases heat from the cooling water by heat exchange between the cooling water and outdoor air.

A steering handle 51 is attached to the upper bracket 43. As the rider turns the steering handle 51, the upper bracket 43 and the front forks 44 turn, to make the motorcycle 1 corner. Arranged in front of the steering handle 51 is an indicator device 52 capable of displaying the vehicle speed, the engine rotation speed, warning information, and the like. Arranged in front of the indicator device 52 is a head lamp 53 for illuminating the front side.

A fuel tank 55 for storing a fuel to be supplied to the engine 40 is arranged at the rear of the upper bracket 43 and above the engine 40. As shown in FIG. 3, the fuel tank 55 is attached to the main frames 12 with interposition of an attachment bracket, by an attachment pin 55a provided in a front portion of the fuel tank 55. The fuel tank 55 is attached to the pair of left and right rear frames 17 with interposition of an attachment bracket, by an attachment pedestal 55b provided in a rear portion of the fuel tank 55. In a lower surface of the fuel tank 55 (and more specifically at a location near the longitudinal (front-rear) and lateral (left-right) center thereof), a recessed portion protruding upward is formed. An air cleaner box 56 is arranged in a space including the recessed portion.

The air cleaner box 56 takes in outdoor air to be supplied to the engine 40, and purifies the outdoor air. The air cleaner box 56 is arranged above the engine 40. The air cleaner box 56 is arranged so as to overlap the main frame 12 and the rear frame 17 in a side view. The air cleaner box 56 is arranged so as to overlap the fuel tank 55 (particularly in this embodiment, such that the whole of air cleaner box 56 overlaps the fuel tank 55) in a plan view. As shown in FIG. 3, the air cleaner box 56 includes an inlet duct 56a, an air filter 56b, and an outlet duct 56c.

The inlet duct 56a is a duct arranged so as to connect the inside and the outside (more specifically, on the front side) of the air cleaner box 56 to each other. Outdoor air is suctioned from the outside of the air cleaner box 56. The air filter 56b removes dust and dirt, etc. contained in the suctioned outdoor air, to purify the outdoor air. The outlet duct 56c outputs to the engine 40 the outdoor air from which dust and dirt, etc. have been removed by the air filter 56b. The outlet duct 56c is arranged more rearward than the inlet duct 56a. The outlet duct 56c outputs the outdoor air toward a throttle body 59 which is arranged in a position below the outlet duct 56c (to be exact, in a position obliquely downward and frontward of the outlet duct 56c).

The throttle body 59 is arranged between the air cleaner box 56 (more specifically, the outlet duct 56c) and the engine 40. The fuel stored in the fuel tank 55 is supplied to a fuel injection device by a fuel pump. In one example, the fuel injection device is equipped in the throttle body 59. The throttle body 59 supplies to the engine 40 the air purified by the air cleaner box 56 and the fuel supplied by the fuel injection device. The throttle body 59 is provided with a valve (not shown) for adjusting the amount of outdoor air to be supplied to the engine 40. The opening degree of this valve is variable in accordance with a throttle operation performed by the rider. Alternatively, an engine control unit 61 which will be described later performs a control for adjusting the opening degree of the valve in accordance with a throttle operation performed by the rider. The engine control unit 61 adjusts the amount of fuel to be injected, a timing of fuel injection, and the like, in accordance with the amount of outdoor air to be supplied to the engine 40, the amount of throttle operation performed by the rider, signals received from various sensors which are attached to the engine 40, and the like.

A seat 57 for a rider to be seated thereon is arranged at the rear of the fuel tank 55. Steps 58 on which the rider seated on the seat 57 places his/her feet are arranged below the seat 57. The rider seated on the seat 57 places his/her feet on the steps 58 with the fuel tank 55 and a region below the fuel tank 55 sandwiched between his/her legs, which allows the rider to stabilize his/her body and to shift his/her weight to left or right when performing part of steering operations.

A cowl 19 is provided in a front portion and in lateral side portions of the motorcycle 1. Particularly in the motorcycle 1 of this embodiment, the cowl 19 covers the main frames 12, the rear frames 17, the rear stays 18, the radiator 54, the air cleaner box 56, and the like, in a side view (FIG. 1).

Figure 4:
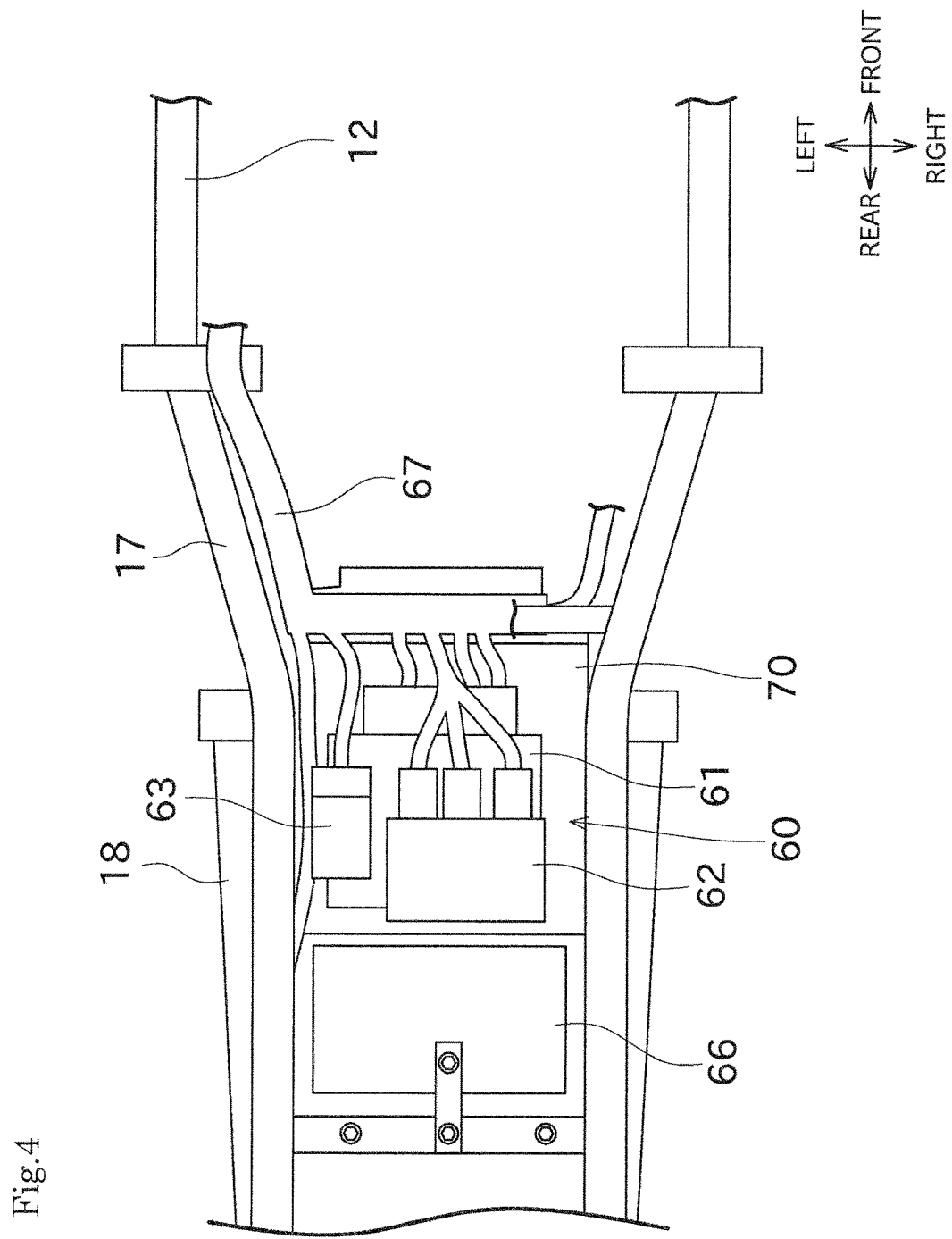
FIG. 4 is a top plan view schematically showing a configuration of the electrical component unit and harnesses extending from the electrical component unit.
Figure 5:
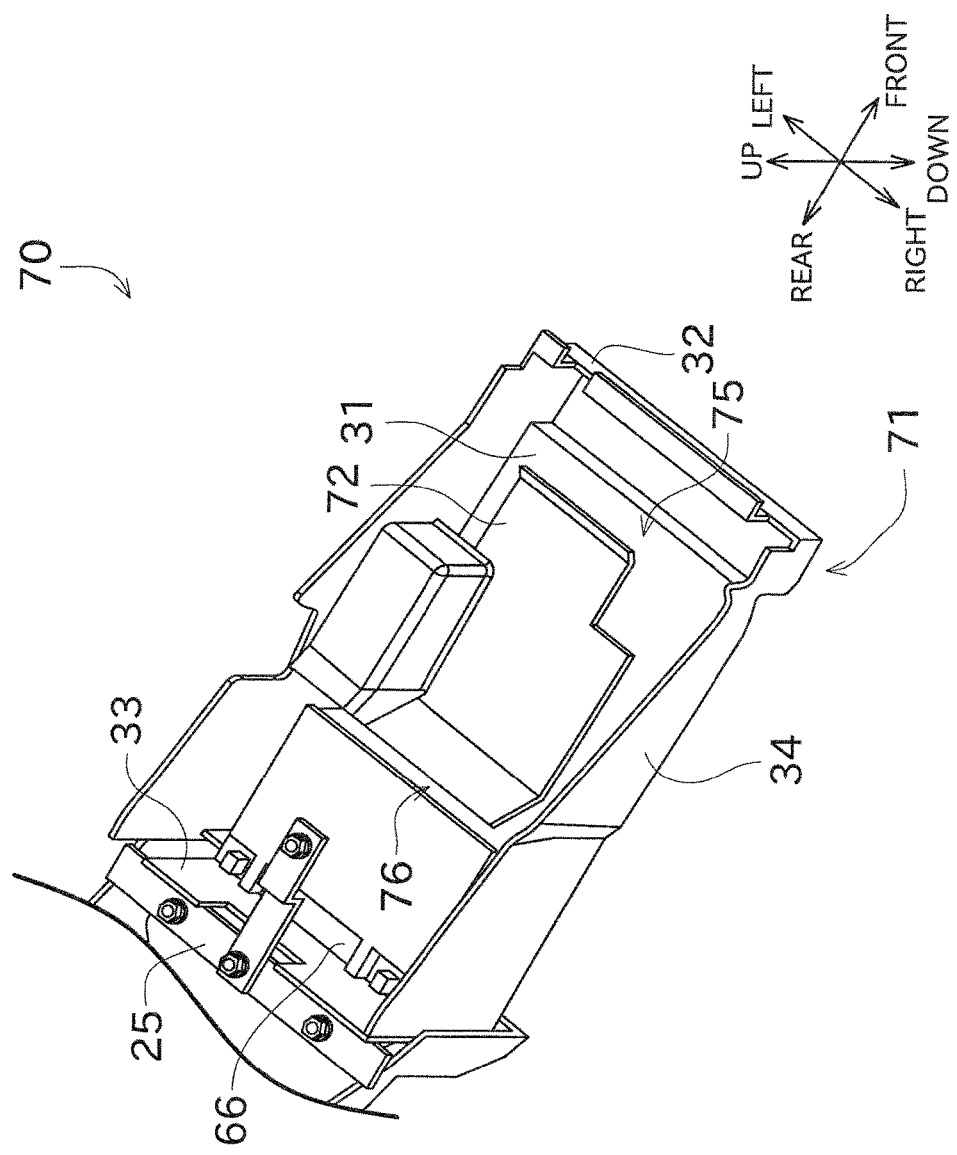
FIG. 5 is a perspective view of a storage box.
Figure 6:
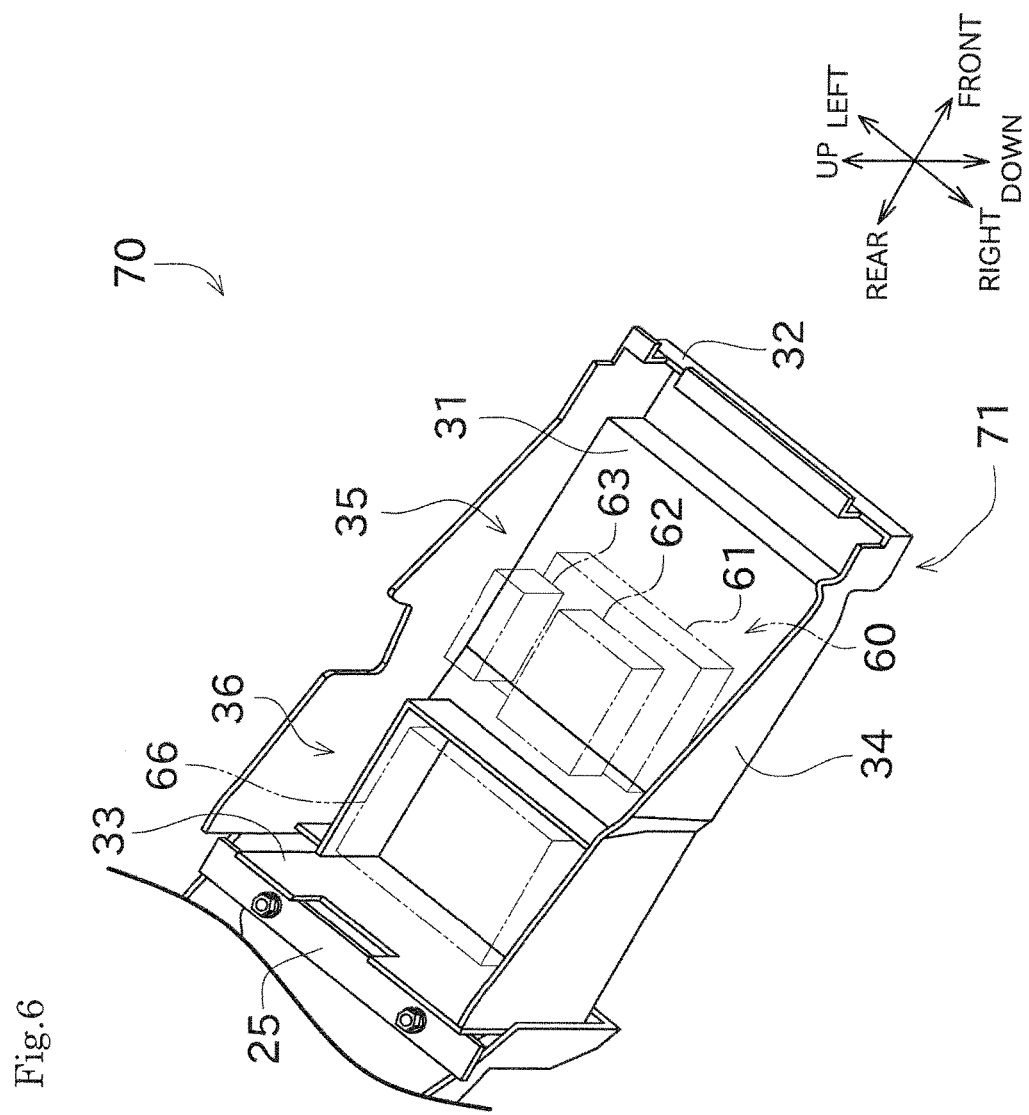
FIG. 6 is a perspective view of the storage box with its lid portion removed.

A layout of the electrical component unit 60 included in the motorcycle 1 will now be described additionally with reference to FIG. 4. FIG. 4 is a top plan view schematically showing a configuration of the electrical component unit 60 and harnesses extending from the electrical component unit 60. FIG. 5 is a perspective view of a storage box 70. FIG. 6 is a perspective view of the storage box 70 with a lid portion 72 removed.

In the specification herein, an electrical component means a component part that is driven by electricity (electric power). In the specification herein, therefore, a battery does not meet the definition of the electrical component, because the battery is a component part that supplies electricity. An electrical component unit means a configuration including two or more types of electrical components arranged adjacent. For example, a configuration including a regulator and a control unit arranged adjacent is considered as the electrical component unit. For example, a configuration including merely a plurality of LEDs arranged side by side does not meet the definition of the electrical component unit. The electrical component unit can be also defined as a configuration in which two or more types of electrical components are collected together. The collected-together configuration means, for example, a configuration in which electrical components are accommodated in the same accommodation member, a configuration in which housings of electrical components are coupled to each other, a configuration in which electrical components are attached to the same attachment member, and the like.

As shown in FIG. 3 and FIG. 4, the electrical component unit 60 of this embodiment includes an engine control unit 61, a relay box 62, and a magnetic switch 63. The engine control unit (ECU) 61 performs controls related to the engine 40 (e.g., a fuel injection control mentioned above, an ignition timing adjustment control, etc.). The relay box 62 is a housing in which a plurality of relays are accommodated. The magnetic switch 63 is a relay (i.e., a starter relay) that supplies electric power to a starter motor in order to start the engine 40. The engine control unit 61 is one type of control system electrical component which performs controls related to the motorcycle 1. The relay box 62 and the magnetic switch 63 are one type of power source system electrical component which supplies power source (electric power) and that performs processing such as conversion.

In the electrical component unit 60, as shown in FIG. 3, FIG. 4, and FIG. 6, the relay box 62 and the magnetic switch 63 are arranged on the upper side of the engine control unit 61. Since the vertical size of the magnetic switch 63 is larger than that of the relay box 62, the upper end of the magnetic switch 63 is located above the upper end of the relay box 62. The relay box 62 and the magnetic switch 63 are arranged laterally side by side. The relay box 62 is arranged to the right, while the magnetic switch 63 is arranged to the left.

As shown in FIG. 4, harnesses are connected to a front portion of the engine control unit 61, a front portion of the relay box 62, and a front portion of the magnetic switch 63. The harnesses are used for at least one of electric power supply or electrical signal transmission. The harnesses are arranged so as to extend toward the front. The harnesses are connected to a harness assembly (which is a bundle of two or more harnesses). The harness assembly extends in the lateral direction in front of the electrical component unit 60. Arranged at the left and right ends of the laterally extending harness assembly are harness assemblies that extend toward the front, of which the left-side harness assembly includes at least part of the harnesses coming from the engine control unit 61 and from the relay box 62 and also includes a harness assembly heading for the indicator device 52. This left-side harness assembly will be referred to as a main harness 67. In this embodiment, the main harness 67 is arranged so as to extend nearby the electrical component unit 60. Here, the main harness 67 may be arranged on the right side instead of the left side.

A battery 66 is arranged at the rear of the electrical component unit 60. The battery 66 stores electric energy that an alternator has generated by using driving power of the engine. The electrical components included in the motorcycle 1 are driven by electric power supplied from the battery 66. The battery 66 has a substantially rectangular parallelepiped shape with its shortest side being parallel to the front-rear direction (longitudinal direction) and its longest side being parallel to the lateral direction. As shown in FIG. 2 and FIG. 4, the battery 66 is arranged such that its lateral position coincides with (overlaps in the lateral direction) at least part of the electrical component unit 60. As shown in FIG. 1 and FIG. 3, the battery 66 is arranged such that its vertical position coincides with (overlaps in the vertical direction) at least part of the electrical component unit 60. Thus, the electrical component unit 60 and the battery 66 are arranged so as to overlap each other in a front view.

Some conventional electrical component unit is arranged such that its vertical position is immediately beneath a seat. In this respect, the electrical component unit 60 of this embodiment is arranged such that its vertical position is below the rear frames 17 which are arranged below the seat 57. In this embodiment, the whole of the electrical component unit 60 is arranged below the rear frames 17, but alternatively only part of the electrical component unit 60 may be arranged below the rear frames 17. In this embodiment, therefore, the electrical component unit 60 can be placed in a position that is lower than the commonly adopted position, which allows the position of the electrical component unit 60 to be closer to the center of gravity. In one example, the center of gravity of the motorcycle 1 is at or in the vicinity of the engine 40 which is a heavy load.

The electrical component unit 60 is arranged such that its vertical position overlaps the engine 40, the radiator 54, and the like. The electrical component unit 60 is arranged such that its vertical position overlaps the air cleaner box 56, but it may be arranged below the lower end of the air cleaner box 56. The electrical component unit 60 is arranged in a position that is above the axle positions of the front tire 41 and the rear tire 42 and that overlaps the upper ends of the front tire 41 and the rear tire 42 under a state where the vehicle is not being ridden.

Some conventional electrical component unit is arranged such that its longitudinal position is near or at the rear of the center of a seat. In this respect, the electrical component unit 60 of this embodiment is arranged such that its longitudinal position is more frontward than the center of the seat 57 or therearound, and more specifically at a position overlapping the rear end of the fuel tank 55. In this embodiment, part of the electrical component unit 60 is arranged more frontward than the rear end of the fuel tank 55, but it may be acceptable that the whole of the electrical component unit 60 is arranged more frontward than the rear end of the fuel tank 55. The electrical component unit 60 is arranged such that at least part of the electrical component unit 60 is more rearward than the rear end of the air cleaner box 56. In other words, at least part of the electrical component unit 60 is in a region between the rear end of the fuel tank 55 and the rear end of the air cleaner box 56. In this embodiment, therefore, the electrical component unit 60 can be placed in a position that is more frontward than the commonly adopted position, which allows the position of the electrical component unit 60 to be closer to the center of gravity. The engine 40, which is a high-temperature heat source positioned close to the center of gravity, is arranged frontward of the electrical component unit 60. To prevent the electrical component unit 60 from being too close to the engine 40 and from being away from the center of gravity toward the front, the electrical component unit 60 is not arranged more frontward than the rear end of the air cleaner box 56.

In this embodiment, most part of the electrical component unit 60 is arranged more frontward than the rear end of the fuel tank 55, and therefore it is impossible (difficult) to access the electrical component unit 60 without removing the fuel tank 55. That is, it is impossible to remove an electrical component included in the electrical component unit 60 or adjust the electrical component without removing the fuel tank 55. A configuration in which the electrical component unit 60 has a lid portion 72 (electrical component unit cover) for covering the electrical component unit 60 from above as will be described later and the fuel tank 55 is arranged above part (especially part that is operated for removing the lid portion 72) of the lid portion 72 makes it impossible to access the electrical component unit 60 without removing the fuel tank 55. Such a configuration provides higher anti-theft properties to the electrical component unit 60. Particularly, the electrical component unit 60 includes the engine control unit 61, and therefore operating the engine control unit 61 to unlock the motorcycle 1 for the purpose of stealing the motorcycle 1 can be prevented. In this embodiment, a bracket for attaching the fuel tank 55 to the rear frames 17 is arranged below the rear end of the fuel tank 55, which makes access to the electrical component unit 60 more difficult. Accordingly, the anti-theft properties can be further increased.

The electrical component unit 60 is arranged such that its longitudinal position overlaps and locates more frontward than the steps 58, the rear suspension 20, and the swing arm bracket 15. In this embodiment, the electrical component unit 60 is arranged frontward of the battery 66. In detail, the whole of the electrical component unit 60 is arranged frontward of the battery 66. Instead of this configuration, only part of the electrical component unit 60 may be arranged frontward of the battery 66. In other words, the electrical component unit 60 and the battery 66 may be arranged such that their longitudinal positions overlap each other.

The lateral position of the electrical component unit 60 is between the pair of left and right rear frames 17. In this embodiment, the whole of the electrical component unit 60 is arranged between the pair of left and right rear frames 17, but alternatively only part of the electrical component unit 60 may be arranged between the rear frames 17. In other words, part of the electrical component unit 60 may overlap the rear frame 17 with respect to the lateral direction.

While a layout of the electrical component unit 60 has been described above; instead of or in addition to the electrical component unit 60, the battery 66 may be arranged in the above-described position of the electrical component unit 60. The above-described positions of the electrical component unit 60 and the battery 66 may be interchanged.

The storage box 70 in which the electrical component unit 60 and the battery 66 are accommodated will now be described with reference mainly to FIG. 5 and FIG. 6.

The above-described position in which the electrical component unit 60 is arranged is close to the engine 40 and is likely to have a high temperature. It therefore may be sometimes difficult to arrange an electrical component. Considering this point, the storage box 70 configured such that the temperature of the electrical component unit 60 and surroundings thereof is less likely to rise is provided in this embodiment. A specific description will be given below.

As shown in FIG. 5 and FIG. 6, the storage box 70 includes a container portion 71 and the lid portion 72. The container portion 71 includes a bottom surface portion 31, a front surface portion 32, a rear surface portion 33, and a side surface portion 34. As shown in FIG. 3, the bottom surface portion 31 of the storage box 70 is supported on a support bracket 22 which is attached to the attachment member 21. The rear end of the storage box 70 is connected to the rear fender 47 via a coupling bracket 25. The coupling bracket 25 is also coupled to a cover which is arranged above the battery 66. As shown in FIG. 6, the storage box 70 has an electrical component unit accommodation part 35 and a battery accommodation part 36.

Since the engine 40 is arranged obliquely downward and frontward of the storage box 70, the storage box 70 is likely to be influenced by heat generated in the engine 40. Here, the storage box 70 is made of a material having heat shielding properties. Thus, heat transferred from the engine 40 is blocked by the container portion 71 (especially the bottom surface portion 31 thereof).

The electrical component unit 60 itself generates heat. If, therefore, the electrical component unit 60 is completely covered by a material having heat shielding properties, a temperature rise may occur in the surroundings of the electrical component unit 60. Considering this point, the storage box 70 of this embodiment is configured to block the heat from the engine 40 and to cool the electrical component unit 60 by taking ram air in.

To be specific, the side surface portion 34 is configured such that its height decreases toward the front. Since a front portion of the side surface portion 34 has a small height, air is easily taken in from lateral sides of a front portion of the storage box 70. Since a rear portion of the side surface portion 34 has a large height, a phenomenon in which the taken-in ram air flows to the outside before passing through the electrical component unit 60 can be reduced.

The height of the front surface portion 32 is equal to or smaller than the height of the front end of the side surface portion 34. Ram air flowing from the front can therefore be taken in. Here, the lid portion 72 is configured to cover the upper side of the electrical component unit 60 while opening the front side and the rear side of the electrical component unit 60. Ram air can therefore be taken in through an introduction port 75 which is defined by the front end of the lid portion 72 and the bottom surface portion 31. Since the harnesses extending toward the front are connected to the electrical component unit 60 as mentioned above, the introduction port 75 is used also as an opening for allowing the harnesses to pass therethrough.

The storage box 70 has a discharge port 76 which is defined by the rear end of the lid portion 72 and the bottom surface portion 31. The battery 66 arranged at the rear of the electrical component unit 60 has a height larger than that of the electrical component unit 60. This may cause a phenomenon in which ram air having passed through the electrical component unit 60 hits the battery 66, the battery accommodation part 36, or the like, and is not smoothly discharged. As a result, fresh ram air cannot be smoothly introduced, so that the efficiency of cooling by the ram air may deteriorate.

In view of this, the lid portion 72 of this embodiment has a tapered rear portion. To be specific, it is tapered with its rear portion being more upward. Such a configuration allows ram air having passed through the electrical component unit 60 to easily flow obliquely upward toward the rear. Accordingly, the ram air can be smoothly discharged.

Figure 7:
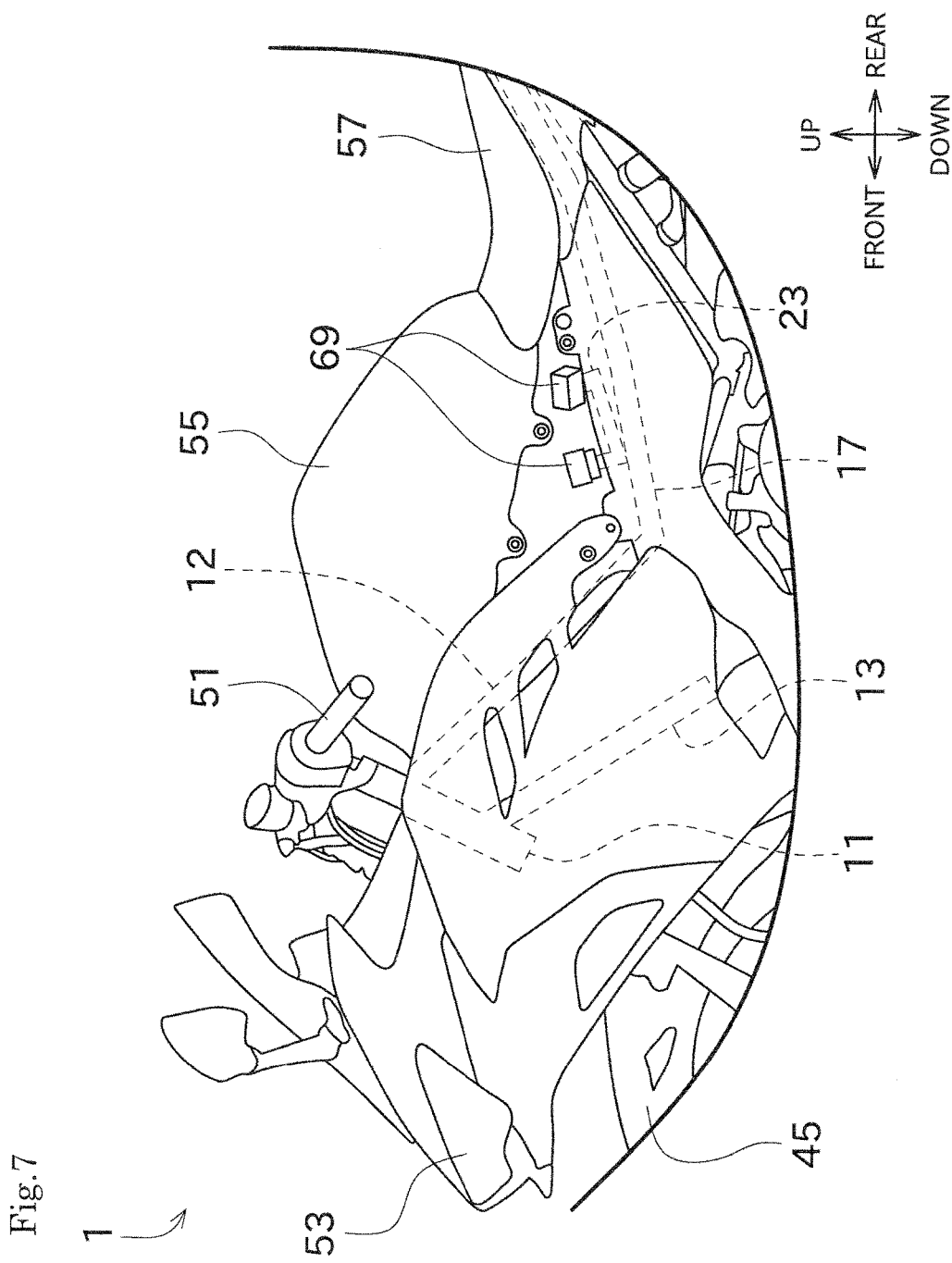
FIG. 7 is a side view of the motorcycle with its cowl component member removed.

An example of another arrangement of electrical components will now be described with reference to FIG. 7. FIG. 7 is a side view of the motorcycle 1 with part of the cowl 19 being removed.

In this embodiment, as described above, it is difficult to access the electrical component unit 60 without removing the fuel tank 55. A situation in which the electrical components included in the electrical component unit 60 is, for example, adjusted or replaced by an owner of the motorcycle 1 by himself/herself is not expected so much. Thus, poor access to the electrical component unit 60 does not matter. In some motorcycles 1, however, it is expected that, for example, an owner adjusts or replaces electrical components by himself/herself. It is preferable that these electrical components are arranged in an easily accessible place. Examples of such electrical components include a fuse box in which a plurality of fuses are accommodated and a diagnosis coupler for connecting a PC or the like for diagnosis of the motorcycle 1. In the motorcycle 1 of this embodiment, a fuse box (second electrical component) 69 is arranged in an easily accessible place. A specific description will be given below.

As described above, the main frames 12 are arranged so as to extend obliquely downward toward the rear, and the rear frames 17 at the rear of the main frames 12 are arranged so as to extend obliquely upward toward the rear. Thus, there is a space above the vicinity of where the main frames 12 and the rear frames 17 are connected to each other. The fuse box 69 is arranged in this space. More specifically, the fuse box 69 is attached to an attachment bracket 23 which protrudes upward from the rear frames 17.

The cowl 19 of the motorcycle 1 includes a plurality of cowl component members. A cowl component member (second cover) arranged so as to close the aforesaid space is denoted by the reference sign 19*a*, as shown in FIG. 1. The cowl component member 19*a* is configured to be removable without removal of another cowl component member and the fuel tank 55. To be specific, the cowl component member 19*a* is fixed by being attached to another cowl component members, the fuel tank 55, and the like. The cowl component member 19*a* is arranged most superficial (laterally outermost) among cowl component members (in other words, a surface of the cowl component member 19*a* does not have any attachment hole for attaching another cowl component member, or the like). This is why the cowl component member 19*a* can be removed without removal of other cowl component members and the fuel tank 55. Merely removing the cowl component member 19*a* permits access to the fuse box 69.

As thus described above, the motorcycle 1 of this embodiment includes the fuel tank 55, the engine 40, the air cleaner box 56, and the electrical component unit 60. The fuel tank 55 stores a fuel. The engine 40 is driven by the fuel stored in the fuel tank 55. The air cleaner box 56 purifies air to be supplied to the engine 40. The electrical component unit 60 includes two or more types of electrical components that are driven by electricity. The fuel tank 55 and the engine 40 are arranged vertically one above the other, and at least part of the air cleaner box 56 is positioned in a space between the fuel tank 55 and the engine 40. The electrical component unit 60 is arranged such that the longitudinal position of at least part of the electrical component unit 60 is more frontward than the rear end of the fuel tank 55 and more rearward than the air cleaner box 56.

In this configuration, the electrical component unit 60 can be arranged in a position close to the center. That is, the electrical component unit 60 is likely to be positioned close to the center of gravity of the vehicle. Accordingly, the motorcycle 1 can be stabilized while traveling.

The motorcycle 1 of this embodiment includes the battery 66 configured to drive at least one of the electrical components included in the electrical component unit 60. The battery 66 and the electrical component unit 60 are arranged so as to overlap each other in a front view. The electrical component unit 60 is arranged such that the longitudinal position of at least part of the electrical component unit 60 is more frontward than the battery 66.

Since the battery 66 and the electrical component unit 60 overlap each other in a front view, the battery 66 and the electrical component unit 60 can be connected to each other without bending the harness so much. In addition, the electrical component unit 60 is likely to be positioned further close to the center of gravity of the vehicle. Accordingly, the motorcycle 1 can be further stabilized while traveling.

In the motorcycle 1 of this embodiment, the electrical components included in the electrical component unit 60 comprise at least the engine control unit 61 and the relay box 62.

Since the engine control unit 61 and the relay box 62 have large weights, the weight of the electrical component unit 60 can be more influential. Arranging the electrical component unit 60 having such a configuration in the above-described position enables the motorcycle 1 to be considerably stabilized while traveling, for example.

The motorcycle 1 of this embodiment includes the main harness 67 which is a bundle of at least the harness connected to at least one of the engine control unit 61 or the relay box 62 and the harness connected to the indicator device 52. The main harness 67 extends nearby the electrical component unit 60.

A number of harnesses are connected to the engine control unit 61 and to the relay box 62. Arranging at least one of them near the main harness allows the main harness 67 to be shortened. This can reduce costs for the harnesses. The main harness 67 tends to be thick, and thus tends to be less maneuverable. In this respect, shortening the main harness 67 can improve workability in assembling.

The motorcycle 1 of this embodiment includes the main frames 12 extending from the head pipe frame 11 toward the rear, and the rear frames 17 extending from the main frames 12 toward the rear. The electrical component unit 60 is arranged such that the vertical position of at least part of the electrical component unit 60 is below the main frames 12 and the rear frames 17.

In this configuration, the position of the electrical component unit 60 can be lowered. Accordingly, the motorcycle 1 can be stabilized.

The motorcycle 1 of this embodiment includes the storage box 70 in which the electrical component unit 60 is accommodated. The storage box 70 has the introduction port 75 for introducing ram air and the discharge port 76 for discharging the ram air introduced through the introduction port 75.

Providing the storage box 70 allows a large number of electrical components to be collectively held, and forming the introduction port 75 and the discharge port 76 enables the electrical component unit 60 to be cooled by ram air.

In the motorcycle 1 of this embodiment, the electrical component unit 60 is covered from above by the lid portion 72. At least part of the lid portion 72 is covered by the fuel tank 55.

It therefore is difficult to access the electrical component unit 60 without removing the fuel tank 55. Accordingly, the electrical components included in the electrical component unit 60 are less likely to be stolen.

The motorcycle 1 of this embodiment includes the fuse box 69 and the cowl component member 19*a*. The fuse box 69 is different from the electrical components included in the electrical component unit 60. The cowl component member 19*a* covers the fuse box 69. A portion for attachment or detachment of the cowl component member 19*a* is not covered by the fuel tank 55 but is exposed.

In this configuration, for example, an electrical component that needs frequent replacement, maintenance, or the like, is arranged as the second electrical component different from the electrical component unit 60, and thereby a replacement work, a maintenance operation, or the like, can be easy.

While a preferred embodiment of the present invention has been described above, the configuration described above may be modified, for example, as follows.

<Electrical Components Included in Electrical Component Unit>

In the embodiment described above, the electrical component unit 60 includes the engine control unit 61, the relay box 62, and the magnetic switch 63, but the electrical component unit 60 may include another combination of electrical components. For example, at least one of the three electrical components mentioned above may be omitted. It however is preferable that the engine control unit 61 and the relay box 62 are included in the electrical component unit 60, because the engine control unit 61 and the relay box 62 have relatively large sizes and weights, and a large number of connectors are connected to the engine control unit 61 and the relay box 62. Other examples of the electrical component include a regulator (power source system electrical component), an ABS control unit (control system electrical component), an electronic control suspension control unit (control system electrical component), an ETC communication device (communication system electrical component), and a CDI (capacitor discharged ignition).

<Storage Box>

Although the storage box 70 of the embodiment described above includes the container portion 71 and the lid portion 72, a configuration in which the lid portion 72 is not provided and the upper side of the storage box 70 is opened may be acceptable. A configuration in which the storage box 70 is omitted and a cover that covers only the upper side of the electrical component unit 60 is provided may also be acceptable.

<Application of the Present Invention>

The embodiment described above illustrates a case where the present invention is applied to a motorcycle intended primarily for sport driving on a paved road. The present invention, however, is applicable to other motorcycles (of motocross type, naked type, cruiser type, and the like). The present invention is also applicable to a straddle vehicle (which means a vehicle that a rider straddles when riding on) different from motorcycles. Main examples of such a straddle vehicle include ATVs (All Terrain Vehicles) for traveling on an unpaved road and PWCs (Personal Water Crafts).

What is claimed is:

1. A straddle vehicle, comprising:
   a fuel tank storing a fuel;
   an engine configured to be driven by the fuel;
   an air cleaner box purifying air to be supplied to the engine, wherein the fuel tank and the engine are arranged vertically one above the other, and at least part of the air cleaner box is positioned in a space between the fuel tank and the engine;
   an electrical component unit including at least two types of electrical components that are driven by electricity, the electrical components comprising at least a fuse box accommodating a plurality of fuses and a diagnosis coupler connecting a diagnostic component configured to diagnose the straddle vehicle,
   wherein the electrical component unit is arranged such that the longitudinal position of at least part of the electrical component unit is more frontward than a rear end of the fuel tank and more rearward than the air cleaner box;
   a main frame arranged to extend obliquely downward toward the rear of the straddle vehicle;
   a rear frame at the rear of the main frame arranged to extend obliquely upward toward the rear of the straddle vehicle, wherein the fuse box and the diagnosis coupler are arranged in a space above a vicinity of where the main frame and the rear frame are connected to each other; and
   a cowl component member arranged to close the space between the fuel tank and the engine.

2. The straddle vehicle according to claim 1, further comprising:
   a battery configured to drive at least one of the electrical components included in the electrical component unit,
   wherein the battery and the electrical component unit are arranged so as to overlap each other in a front view, and
   wherein the electrical component unit is arranged such that the longitudinal position of at least part of the electrical component unit is more frontward than the battery.

3. The straddle vehicle according to claim 1, wherein the electrical components included in the electrical component unit comprise at least an engine control unit and a relay box.

4. The straddle vehicle according to claim 3, further comprising:
   an indicator device displaying at least a vehicle speed; and
   a main harness including a bundle of at least a harness connected to at least one of the engine control unit or the relay box and a harness connected to the indicator device,
   the main harness extending nearby the electrical component unit.

5. The straddle vehicle according to claim 1, further comprising:
   a storage box accommodating the electrical component unit,
   wherein the storage box includes an introduction port introducing ram air and a discharge port discharging the ram air introduced through the introduction port.

6. The straddle vehicle according to claim 5, wherein the storage box comprises an electrical component accommodation part accommodating the electrical component unit and a battery accommodation part accommodating a battery.

7. The straddle vehicle according to claim 1, wherein the electrical component unit is covered from above by an electrical component unit cover, and wherein at least part of the electrical component unit cover is covered by the fuel tank.

8. A straddle vehicle, comprising:
   a fuel tank storing a fuel;
   an engine configured to be driven by the fuel;
   an air cleaner box purifying air to be supplied to the engine;
   an electrical component unit including at least two types of electrical components that are driven by electricity,
   a main frame extending from a head pipe frame toward the rear; and
   a rear frame extending from the main frame toward the rear,
   wherein the fuel tank and the engine are arranged vertically one above the other, and at least part of the air cleaner box is positioned in a space between the fuel tank and the engine, and
   wherein the electrical component unit is arranged such that the longitudinal position of at least part of the electrical component unit is more frontward than a rear end of the fuel tank and more rearward than the air cleaner box, wherein the electrical component unit is arranged such that the vertical position of at least part of the electrical component unit is below the main frame and the rear frame.

9. A straddle vehicle, comprising:
a fuel tank storing a fuel;
an engine configured to be driven by the fuel;
an air cleaner box purifying air to be supplied to the engine;
an electrical component unit including at least two types of electrical components that are driven by electricity,
an electrical unit cover covering the electrical component unit from above, wherein at least part of the electrical component unit cover is covered by the fuel tank,
a second electrical component different from the electrical components included in the electrical component unit; and
a second cover covering the second electrical component, wherein a portion for attachment or detachment of the second cover is not covered by the fuel tank,
wherein the fuel tank and the engine are arranged vertically one above the other, and at least part of the air cleaner box is positioned in a space between the fuel tank and the engine,
wherein the electrical component unit is arranged such that the longitudinal position of at least part of the electrical component unit is more frontward than a rear end of the fuel tank and more rearward than the air cleaner box.

* * * * *